UNITED STATES PATENT OFFICE.

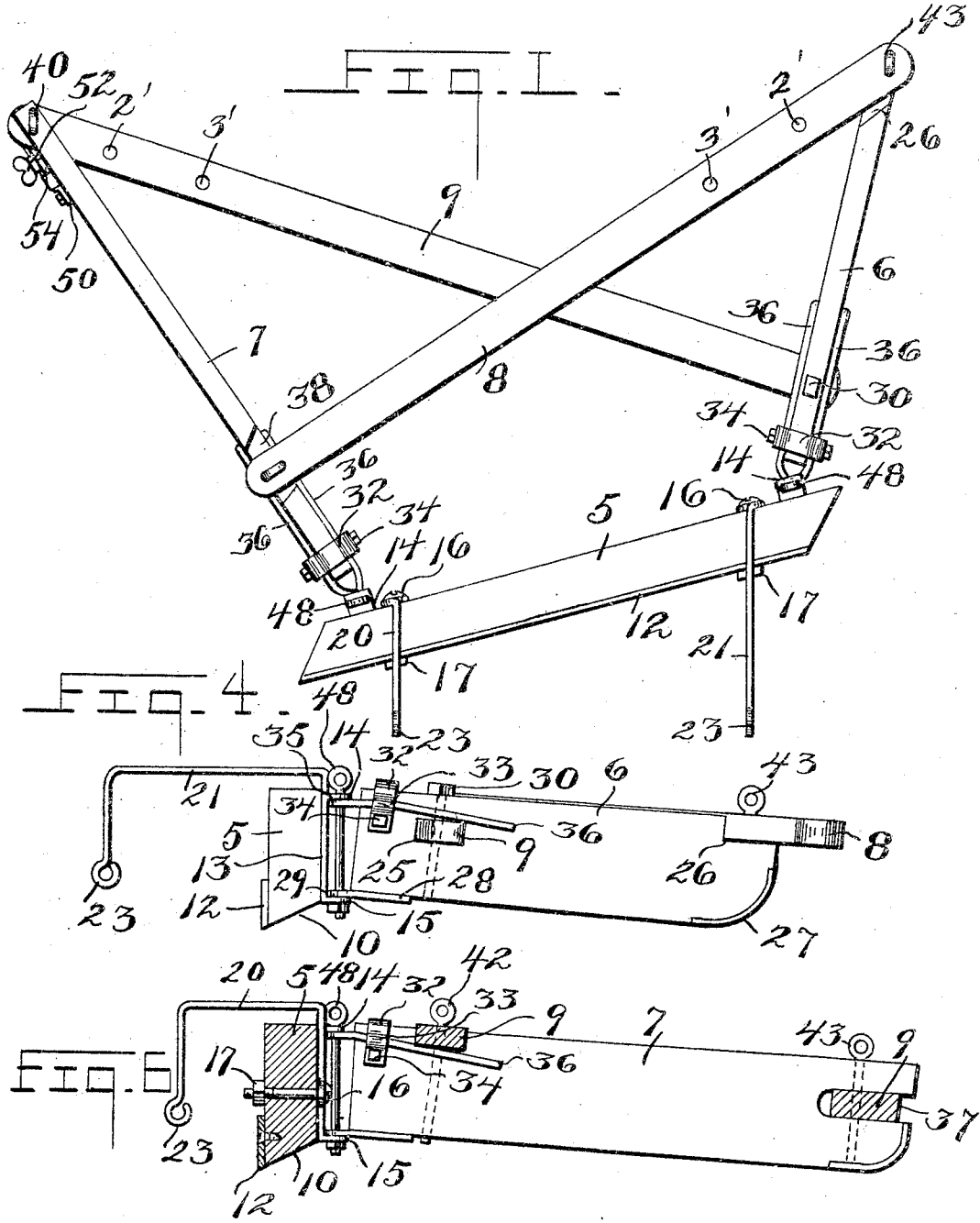

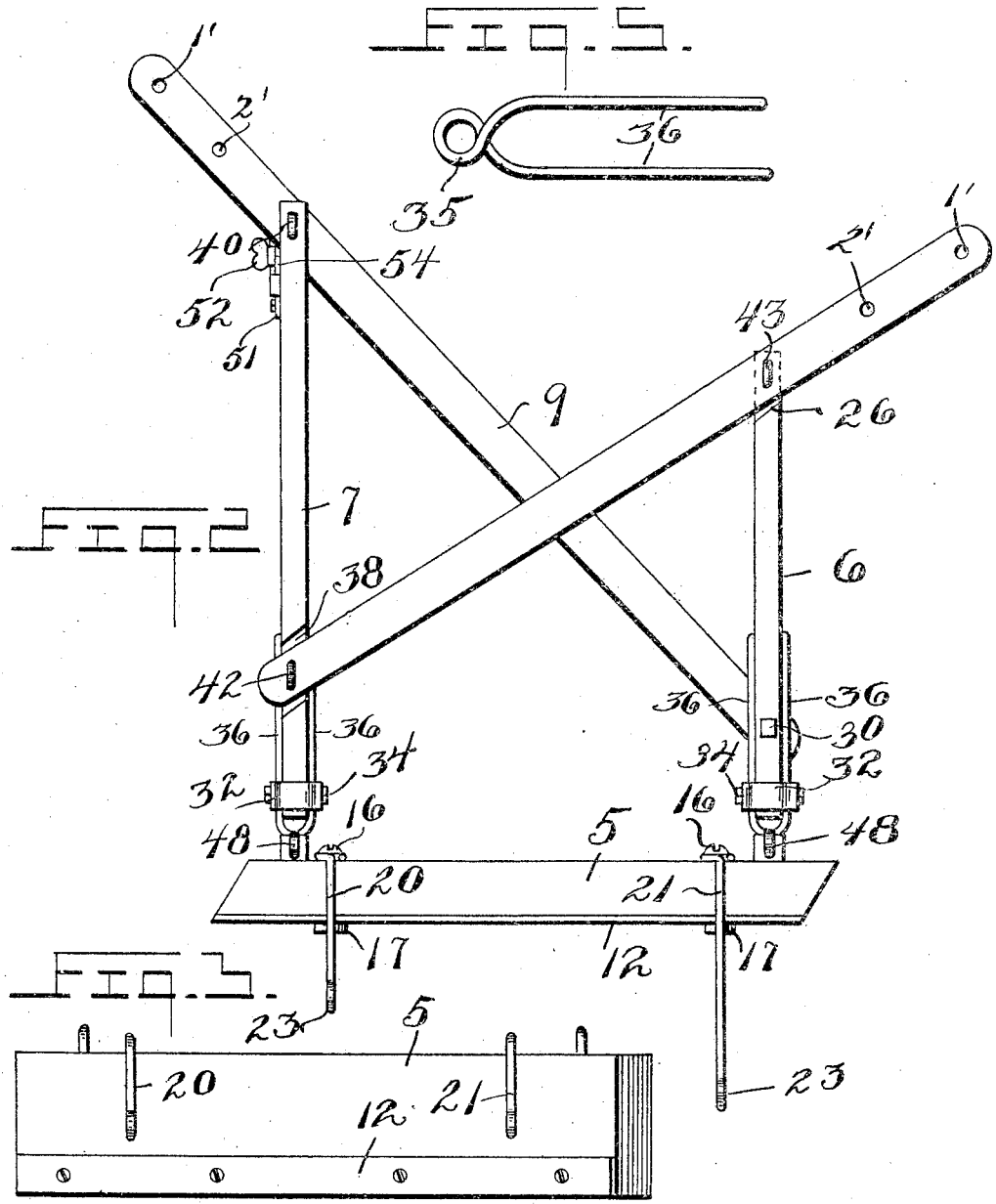

FRANK L. REISING, OF PIPER CITY, ILLINOIS.

ROAD GRADER AND SCRAPER.

958,891.  Specification of Letters Patent.  Patented May 24, 1910.

Application filed November 5, 1909. Serial No. 526,376.

*To all whom it may concern:*

Be it known that I, FRANK L. REISING, a citizen of the United States, residing at Piper City, in the county of Ford and State of Illinois, have invented certain new and useful Improvements in Road Graders and Scrapers, of which the following is a specification.

This invention has relation to certain new and useful improvements in road graders and scrapers.

The object of my invention is to provide a light, simply constructed, adjustable frame, carrying a cutting blade which may be given a vertical adjustment backward or forward, as well as an adjustment in a horizontal plane, so that the cutting face of the scraper may be drawn forward at right angles to the line of advance, or obliquely thereto.

With the above and other objects in view, the present invention consists in the combination and arrangement of parts as will be hereinafter more fully described and particularly pointed out in the appended claims, it being understood that changes in the specific structure shown and described may be made within the scope of the claims without departing from the spirit of the invention.

In the drawings forming a part of this specification, and in which like numerals of reference indicate similar parts in the several views, Figure 1 is a top view of a grader and scraper embodying my invention disclosing the same in one of its extreme adjustments, Fig. 2 shows a top view of my device disclosing the instrumentalities as arranged in the second extreme adjustment, Fig. 3 is a front elevation, Fig. 4 is a side elevation, Fig. 5 is a detail of one of the fork shaped connecting members, Fig. 6 is a central sectional view. Fig. 7 shows an enlarged rear fragmentary portion of one of the runners.

In carrying out the aim of my invention, I employ a bar 5, which has a lower beveled edge as is shown at 10, while the forward lower edge is reinforced by means of the knife 12. To the rear this bar 5 carries two similar ear plates 13, each having an upper ear 14 and a lower ear 15. This knife bar 5 further carries two bolts 16, secured in front by means of the nuts 17, these bolts as shown being secured near the lower beveled edge of the bar. Extending from each bolt 16, is an arcuate drag arm marked 20 and 21 in the drawings. The arm 20 it will be noticed is somewhat longer than the arm 21, each of these drag arms ending in a terminal eye 23 to which is secured the clevis of the doubletree or a suitable drag chain.

In connection with my invention I use two runners marked 6 and 7, the runner 7 being somewhat longer than the runner 6. The runner 6 near its forward end has an aperture 25, and near its rear upper edge a seat 26, while secured to the rear lower edge is the rub plate 27.

Near the lower forward end of the runner 6, I secure the eye plate 28, the eye 29 of which is arranged for coaction with the ear 15 as disclosed in Fig. 4. Passing through the aperture 25 is the securing bolt 30, while secured near the upper forward corner of this runner is the yoke 32 having the oppositely positioned arcuate portions 33, a clamping bolt 34 securing this yoke to the runner. This yoke serves as a pinching member in securing the forked securing member as used in my invention including the forward eye 35 and the two curved tines 36, these tines being arranged to be held within the arcuate portion 33 so that by means of the bolt 34 the yoke 32 can be pinched upon these tines to securely hold this member to the runner.

Held within the aperture 25 and upon the bolt 30 is the forward end of the adjusting bar 9, this bar 9 at its rear end being provided with the adjusting openings marked 1', 2' and 3'. This bar 9 has its rear end adjustably held within the slot 37 within the rear end of the opposite runner 7, which runner near the upper forward corner is provided with the seat 38, an adjusting pin 40 holding this brace bar 9 to the rear end of the runner 7. Held upon the pin 42 within the runner 7 is the upper adjusting bar 8, which at its rear end is provided with the three adjusting openings marked 1', 2' and 3', a pin 43 adjustably securing this cross bar 8 to the rear end of the short runner 6, as disclosed in Fig. 4. The two bars 8 and 9 are thus adjustably secured crosswise to the runners.

The runners 6 and 7 are secured to the ear plates 13 by means of the bolts 48.

In Fig. 4 the knife bar 5 is shown in vertical position. Should it be desired to present the face of the knife bar obliquely to the road surface, the bolts 34 would be released to permit the forked members 36 being drawn forward. By this means, adjustment in a vertical plane may be imparted to the knife bar.

When the knife bar is arranged to be used in directing the earth toward the center of a road, the bar is set at an angle. This is accomplished in carrying the rear ends of the runners toward or away from one another, which can be readily accomplished in adjusting the pins 40 and 43 within the various openings of the cross bars.

As there would be a tendency for the frame to swerve toward the edge of the road while the knife bar is advanced at an angle, I guard against this contingency, in providing the longest runner 7 near the rear end with the strap 50 secured by means of the bolts 51 and adjacent thereto fix the hand bolts 52, and secure below the strap 50 the knife shoe 54. This shoe has a slot 55 to receive the hand bolts 52, so that the lower edge of this knife shoe may be extended any desirable distance beyond the lower edge of the runner. The runner 6 which travels within the center of the road is not provided with any guiding means.

In Figs. 1 and 2 I have shown the machine as arranged in its two extreme positions.

The device can be used as a grader, as well as a scraper, and is simple in construction and both durable and efficient in operation.

What is claimed is:

1. In combination, a knife bar, an upper and lower ear secured to each end of said bar, a long and a short arcuate drag arm extending from said knife bar, a long and a short runner, an eye secured to the lower forward corner of each runner, a pinch yoke secured to the upper forward corner of each runner, a clamping bolt passing through each runner and connected yoke, a forked securing member having a terminal bolt eye, the tines of said member being adjustably held below said yoke, two bars adjustably secured crosswise to said runners, and bolts passing through said ears and eyes.

2. In combination, a knife bar having a lower beveled edge, an upper and lower ear secured to each end of said bar, a long and a short arcuate drag arm extending from said knife bar, a knife secured to the lower edge of said bar, a long and a short runner, an eye secured to the lower forward corner of each runner, a pinch yoke secured to the upper forward corner of each runner, a clamping bolt passing through each runner and connected yoke, a forked securing member having a terminal bolt eye and curved tines held below said yoke, two bars adjustably secured crosswise to said runners, and means to connect said ears to said eye.

3. The combination with a runner, of an adjusting mechanism including a pinch yoke, a bolt to engage said pinch yoke, and a fork having a terminal eye and two curved tines, held below said pinch yoke.

In testimony whereof I affix my signature, in presence of two witnesses.

FRANK L. REISING.

Witnesses:
SAM MORROW,
LESTER F. SOWERS.